Nov. 15, 1938.    R. F. OSTRANDER    2,136,706
PRESSURE CONTROL FOR HYDRAULIC BRAKES
Filed Aug. 20, 1937    2 Sheets-Sheet 1
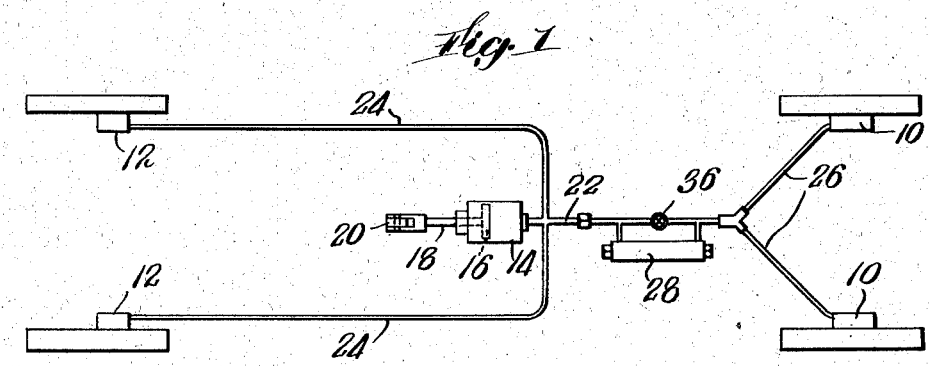
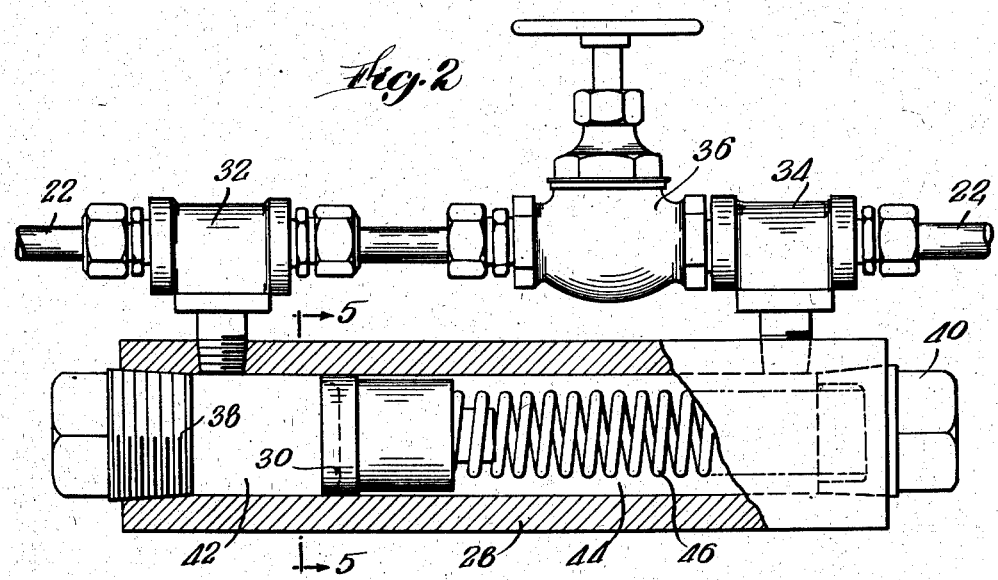
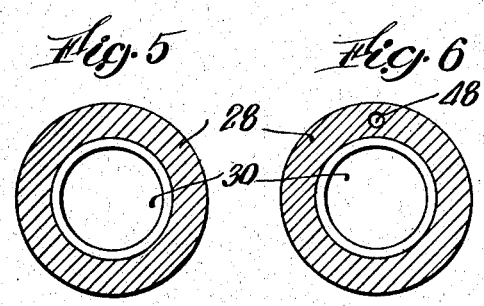
Inventor:
Robert F. Ostrander
by Thomson & Thomson
his Attys.

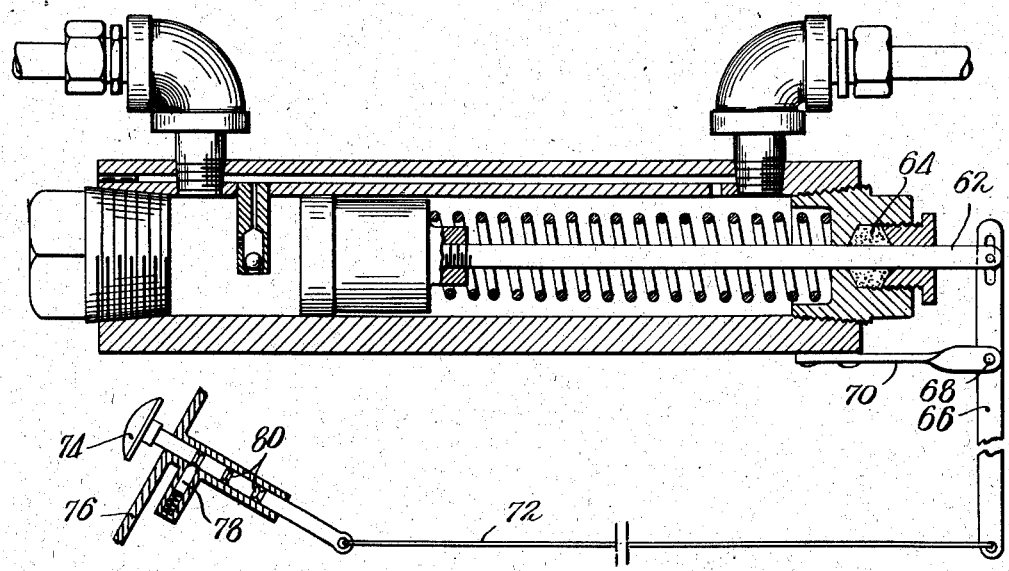
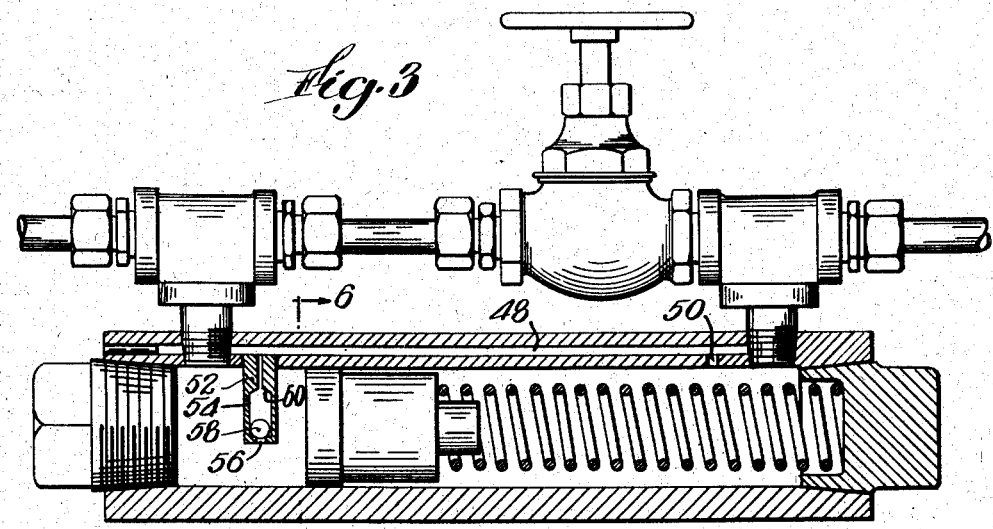

Patented Nov. 15, 1938

2,136,706

UNITED STATES PATENT OFFICE 2,136,706

PRESSURE CONTROL FOR HYDRAULIC BRAKES

Robert F. Ostrander, New Haven, Conn.

Application August 20, 1937, Serial No. 160,103

4 Claims. (Cl. 188—152)

This invention relates to improvements in hydraulic brake systems for automobiles, and pertains more particularly to devices for causing a differential in pressure between the driving wheel brakes and the steering wheel brakes of a vehicle.

In the hydraulic braking systems now in common use, hydraulic pressure is applied equally to the brake mechanism of all four wheels, by depressing a brake pedal to operate a piston in the master cylinder of the system. Even though the mechanical brake mechanism at the wheels may be so constructed or adjusted or different sized cylinders may be used so that one set of brakes will be applied with greater or less force than the other set, the affective pressure in the hydraulic system is the same for both sets of brakes and one set is energized at the same time and to an equal degree. Hence, regardless of variation in the mechanical braking devices or the type of mechanism employed, the steering wheel brakes are applied as soon as the driving wheel brakes, and hydraulic pressure is built up equally and uniformly until the brakes lock.

It is well understood that the simultaneous application of braking pressure to the front and rear brakes of an automobile (normally the steering and driving wheels, respectively) tends to cause the vehicle to skid and the driver to lose control of his steering mechanism, when the road is slippery due to rain, snow, ice or other weather conditions which reduces tractional friction. The results of such skids are frequently serious to the driver and passengers as well as to the car.

The primary purpose of the present invention is, therefore, to substantially reduce if not eliminate, skidding due to brake application, by retarding and reducing the effective operation of the steering wheel brakes through the use of a control device which creates an initial differential in pressure in the hydraulic system. The control means preferably comprises a cylinder and piston interposed in the hydraulic line between the master cylinder and the steering wheel brakes and adapted to isolate the brake fluid which energizes said brakes from the master cylinder; and resilient means constructed and arranged to resist and delay movement of said piston when the brake pedal is depressed.

Further objects of the invention reside in the provision of a by-pass connecting the ends of the said cylinder at opposite sides of the piston, which allows the pressure in the line to equalize while the system is inoperative and thereby ensure braking pressure on the front or steering wheels even though some fluid may have been lost from the hydraulic line to the brake mechanism of said wheels. Another object is to provide means for manually adjusting the position of the piston of the control device, thereby to regulate the effect of said control under varying driving conditions and to take care of variations in different braking systems in distributing the percentage of braking between the front and rear brakes.

The utilization of the subject matter of this invention not only reduces skidding tendency, but also affords a flexible control of the braking system and produces a cushioning action with relatively light pedal operation but without sacrifice of full pedal manipulation when needed. Furthermore, it constitutes a safety device, for the bottoming of the spring of the control means will ensure full application of the rear brakes in the case of a leak in the front brake line, ahead of the control.

Recommended embodiments of the invention are shown in the accompanying drawings, in which:

Fig. 1 is a diagrammatic view of the hydraulic brake system of an automobile, equipped with the control device;

Fig. 2 is a side elevation, partly in vertical section, of the control;

Fig. 3 is a view similar to Fig. 2 but showing the optional by-pass arrangement;

Fig. 4 is a similar view of another modified form of the control device, including a normal adjustment therefor; and Figs. 5 and 6 are sections taken on lines 5—5 and 6—6 of Figs. 2 and 3, respectively.

Fig. 1 diagrammatically illustrates a hydraulic brake system including front brakes 10—10, and rear brakes 12—12 operated from the master cylinder 14. The piston 16 in the master cylinder is under manual control of the operator through the piston rod 18 and brake lever 20 in the usual manner. The hydraulic pressure is supplied from the master cylinder to the rear brakes through the main pipe 22 and branches 24—24. The branches 26—26 convey the hydraulic pressure from the main line 22 to the front wheel brakes.

In the usual hydraulic brake system, as thus far described, the hydraulic pressure is equalized throughout the system and the front brakes are applied with the same pressure as the rear brakes. In slippery driving there is a tendency for the front wheel brakes to lock and the wheels to slide while the driving rear wheels continue to turn. The loss of front wheel traction makes it impossible to steer the vehicle.

According to my invention the braking action at the front wheel is delayed and reduced relative to the rear wheel braking. I accomplish this result by inserting the cylinder 28 and piston 30 in the line 22. A desirable arrangement for changing over an existing system is illustrated in Fig. 2 in which the spaced T unions 32—34 are coupled into the pipe line 22 and a shut-off valve 36 is installed between the unions. The unions 32 and 34 are mounted at the opposite ends of the cylinder 28.

Closure of the valve 36 serves to cut off the hydraulic brake fluid in the front brake system from the main cylinder and the rear brake system but pressure will be transmitted through movement of the piston 30. The cylinder has open ends for assembly of the piston and heads 38 and 40 are threaded into the ends of the cylinder to provide a closed chamber. The piston separates the left-hand chamber portion 42 which is in communication with the main cylinder from the right-hand chamber portion 44 which is in communication with the front wheel brake cylinders.

In operation movement of the piston in the main cylinder develops hydraulic pressure acting to force on the rear brakes and tending to move the piston 30 against the resistance of the spring 46.

The piston 30 will not move until the rear brakes have been partially applied and the developed hydraulic pressure is sufficient to compress the spring 46. Movement of the piston 30 will develop hydraulic pressure in the branch lines 26 and cause application of the front brakes. It will be apparent that the pressure in the front lines 26 will be less than in the rear lines 24 by the amount of the reaction of the spring 46. The spring reaction increases as the piston is moved. The entire movement of the piston may be about one inch unless a leak occurs in the front brake system in which case the piston 30 will move until the spring is completely compressed. The piston thus serves as a safety device to insure operation of the rear brakes in spite of the failure of the front brakes.

The spring pressure for different types of cars depends upon conditions, but I have found the following to be satisfactory. For small cars the spring has a resistance of 50 lbs. when compressed ½ inch and 100 lbs. when compressed 1 inch; for medium cars the spring has a resistance of 75 lbs. when half compressed and 150 lbs. when fully compressed; and for larger cars the spring may have a force of 200 lbs. when fully compressed. Under light pedal pressure it will be understood that the rear brakes will be partially applied and the front brakes may not be applied at all. The piston and spring then act as a cushion and provide for a more flexible and smoother control of the braking action.

To enable maintenance of the system and to avoid loss of front brakes due to slight leakage, it may be found desirable to employ a by-pass as disclosed in Fig. 3. In this view, the cylinder has a drilled passage 48 leading at one end 50 into chamber 44 and at the other end through a ball valve-housing 52 into chamber 42. The housing 52 has exit openings 54 and 56. The ball valve 58 will close the by-pass when forced against the seat 60 as pressure is applied to the system, port 54 being substantially smaller than port 56, so that the closing of the valve is not impeded by the relatively small quantity of fluid entering port 54. When the system is inoperative the valve will be open to allow fluid to fill the front brake system from the master cylinder.

In Fig. 4, I have shown provision for manual adjustment of the spring pressure. A piston rod 62 is extended through the stuffing box 64 and is operated by the lever 66 pivoted at 68 on bracket 70. The lever 66 is moved by a pull member 72 which connects to an adjustable control member 74 mounted in the dash-board 76. The member 74 is locked in one of a plurality of positions by providing a spring pressed dog 78 cooperating with spaced grooves 80. This makes it possible for the operator to adjust the spring pressure and therefore to reduce the hydraulic pressure applied to the front brakes to the desired degree in accordance with the particular braking system and the driving conditions. On most of the newer cars larger cylinders are used at the front brakes than at the rear, thus developing more effective locking pressure at the front. In such cars it may be desirable in slippery driving with my arrangement to build up an initial compression of the spring.

The spring is so designed that upon a break in the line the spring will bottom before a complete loss of pedal pressure. The spring results in a flexible pedal as upon initial pedal movement the rear brakes come on in the normal manner but the spring must be compressed before the front brakes are applied. The spring compression results in a smooth application of the rear brakes. Up to a predetermined point the spring controls the braking differential between the front and rear brakes, but after the brake shoes at the front have come into complete contact with the brake drum there will be little further displacement of the spring and the front brake pressure will build up rapidly.

I claim:

1. In an hydraulic brake system, a master cylinder having an operable piston thereon, means for transmitting hydraulic pressure from said master cylinder to the rear brakes, means for transmitting hydraulic pressure from the master cylinder to the front brakes, said last named means including a control cylinder in a common hydraulic line to said front brakes, a movable piston therein and spring means for resisting movement of said piston in the direction for transmitting hydraulic pressure to the front brakes, whereby the front brake hydraulic pressure only is reduced by the resistance produced by said spring means, and a by-pass connecting the ends of the control cylinder, said by-pass having a self-acting one-way valve which causes the brake fluid to equalize on opposite sides of its piston while the brake system is inoperative.

2. In an hydraulic brake system, a master cylinder having an operable piston therein, means for transmitting hydraulic pressure from said master cylinder to the rear brakes, means for transmitting hydraulic pressure from the master cylinder to the front brakes, said last named means including a control cylinder, a movable piston therein effective to transmit pressure to the front brakes and spring means for resisting movement of said piston in the direction for transmitting hydraulic pressure to the front brakes, whereby the front brake hydraulic pressure only is reduced by the resistance produced by said spring means, and means for manually adjusting the inoperative position of the piston with respect to the control cylinder, said means being effective to contract said spring.

3. In an hydraulic brake system of an automobile, a master cylinder for transmitting hydraulic pressure to the brakes of the four wheels of the automobile, a conduit leading from said master cylinder toward the front wheel brakes, a control cylinder in said conduit, a movable piston in said cylinder effective to transmit hydraulic pressure to the front brakes, a spring in said cylinder for resisting movement of the piston in a direction for transmitting such hydraulic pressure, whereby the pressure on the front brakes only is reduced by the resistance afforded by said spring, a rod connected to said piston and extending outwardly of the cylinder, and means under the control of the operator of the automobile for moving said rod to adjust the inoperative position of the piston with respect to the control cylinder, said means being effective to contract said spring.

4. In an hydraulic brake system of an automobile, a master cylinder for transmitting hydraulic pressure to the brakes of the four wheels of the automobile, a conduit leading from said master cylinder toward the front wheel brakes, a control cylinder in said conduit, a movable piston in said cylinder effective to transmit hydraulic pressure to the front brakes, a spring in said cylinder for resisting movement of the piston in a direction for transmitting such hydraulic pressure, whereby the pressure on the front brakes only is reduced by the resistance afforded by said spring, a rod connected to said piston and extending outwardly of the cylinder, and means under the control of the operator of the automobile for moving said rod to adjust the inoperative position of the piston with respect to the control cylinder, said means being effective to contract said spring, and comprising an adjustable control member and a spring pressed dog for locking the control member in adjusted position.

ROBERT F. OSTRANDER.